US009969644B2

United States Patent
Gross et al.

(10) Patent No.: US 9,969,644 B2
(45) Date of Patent: May 15, 2018

(54) DAMAGE RESISTANT GLASS WITH HIGH COEFFICIENT OF THERMAL EXPANSION

(71) Applicant: Corning Incorporated, Corning, NY (US)

(72) Inventors: Timothy Michael Gross, Corning, NY (US); Xiaoju Guo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days. days.

(21) Appl. No.: 14/465,888

(22) Filed: Aug. 22, 2014

(65) Prior Publication Data

US 2015/0064472 A1 Mar. 5, 2015

Related U.S. Application Data

(60) Provisional application No. 61/870,301, filed on Aug. 27, 2013.

(51) Int. Cl.
*C03C 3/097* (2006.01)
*C03C 21/00* (2006.01)
*C03C 4/18* (2006.01)

(52) U.S. Cl.
CPC .......... *C03C 3/097* (2013.01); *C03C 4/18* (2013.01); *C03C 21/002* (2013.01); *C03C 2204/00* (2013.01); *Y10T 428/315* (2015.01)

(58) Field of Classification Search
None
See application file for complete search history.

(56) References Cited

U.S. PATENT DOCUMENTS

| 4,042,405 | A | * | 8/1977 | Krohn | C03C 3/097 351/159.57 |
| 4,055,703 | A | * | 10/1977 | Rinehart | C03C 3/062 428/218 |
| 6,518,211 | B1 | * | 2/2003 | Bradshaw | C03C 3/085 428/410 |
| 8,765,262 | B2 | | 7/2014 | Gross | |
| 9,156,724 | B2 | * | 10/2015 | Gross | C03C 3/091 |

(Continued)

FOREIGN PATENT DOCUMENTS

| WO | WO 2012008236 A | * | 1/2012 | |
| WO | WO 2012008236 A1 | * | 1/2012 | C03C 3/085 |
| WO | WO 2012099053 A | * | 7/2012 | |

OTHER PUBLICATIONS

European Patent Office; International Search Report; dated Nov. 24, 2014; pp. 1-3.

(Continued)

*Primary Examiner* — David Sample
(74) *Attorney, Agent, or Firm* — Kevin M. Johnson (57) ABSTRACT

Ion exchangeable glasses having coefficients of thermal expansion (CTE) at least about $90 \times 10^{-7}$° C.$^{-1}$. The glasses undergo rapid ion exchange, for example, in a molten $KNO_3$ salt bath to a depth of layer of greater than 30 microns in less than 2 hours at temperatures of 370° C. to 390° C. When ion-exchanged to a depth of layer between 30 to 50 microns, the glasses exhibit a Vickers median/radial crack initiation threshold exceeding 30 kilograms force (kgf). The glasses are fusion formable and, in some embodiments, compatible with zircon.

37 Claims, 2 Drawing Sheets

(56) References Cited

U.S. PATENT DOCUMENTS

| | | | |
|---|---|---|---|
| 2010/0035745 A1* | 2/2010 | Murata | C03C 3/083 501/66 |
| 2011/0294648 A1 | 12/2011 | Chapman et al. | 501/63 |
| 2011/0294649 A1* | 12/2011 | Gomez | C03C 21/001 501/66 |
| 2012/0052271 A1* | 3/2012 | Gomez | C03C 3/091 428/213 |
| 2012/0135226 A1 | 5/2012 | Bookbinder et al. | 428/335 |
| 2013/0115422 A1* | 5/2013 | Murata | C03C 3/085 428/141 |
| 2013/0122284 A1 | 5/2013 | Gross | 428/336 |
| 2013/0122313 A1* | 5/2013 | Gross | C03C 3/04 428/428 |
| 2013/0288001 A1* | 10/2013 | Murata | C03C 3/085 428/141 |
| 2014/0170380 A1* | 6/2014 | Murata | C03C 3/087 428/141 |
| 2014/0308526 A1* | 10/2014 | Chapman | C03C 21/002 428/410 |
| 2015/0037586 A1* | 2/2015 | Gross | C03C 3/087 428/410 |
| 2015/0064473 A1* | 3/2015 | Dejneka | C03C 3/097 428/410 |
| 2015/0368150 A1 | 12/2015 | Gross | |

OTHER PUBLICATIONS

Introduction to Glass Science and Technology by James E. Shelby, p. 151; The Royal Society of Chemistry.

\* cited by examiner

FIG. 1

DAMAGE RESISTANT GLASS WITH HIGH COEFFICIENT OF THERMAL EXPANSION

This application claims the benefit of priority under 35 U.S.C. § 119 of U.S. Provisional Application Ser. No. 61/870,301, filed on Aug. 27, 2013, the content of which is relied upon and incorporated herein by reference in its entirety.

BACKGROUND OF INVENTION

The disclosure relates to a glass for use as a large format cover glass. More particularly, the invention relates to an ion exchangeable glass for such applications. Even more particularly, the disclosure relates to an ion exchangeable glass having a coefficient of thermal expansion that is sufficiently high for use as a large format cover glass.

Glasses are used in as protective covers for appliances such as LCD displays. In some applications, such displays are supported by an outer frame, typically made of a metal, steel, or alloy. As the display size increases (e.g., 55 inch diagonal), it is critical that the coefficient of thermal expansion (CTE) of the glass match that of the frame material, otherwise the glass will be subjected to various stresses that may cause distortion or failure. None of the commercially available glasses that are presently in use meet this requirement.

SUMMARY OF INVENTION

Ion exchangeable glasses having coefficients of thermal expansion (CTE) at least about $90 \times 10^{-7}$ $°C.^{-1}$ are provided. The glasses comprise $SiO_2$, $Al_2O_3$, $P_2O_5$, $K_2O$, and, in some embodiments, MgO. The glasses undergo rapid ion exchange, for example, in a molten $KNO_3$ salt bath to a depth of layer of greater than 30 microns in less than 2 hours at temperatures of 370° C. to 390° C. When ion-exchanged to a depth of layer between 30 to 50 microns, the glasses exhibit a Vickers median/radial crack initiation threshold exceeding 15 kilograms force (kgf). The glasses are fusion formable (i.e., the liquidus temperature is less than the 160 kP temperature) and, in some embodiments, compatible with zircon (i.e., the zircon breakdown temperature is greater than the 35 kP temperature of the glass).

Accordingly, one aspect of the disclosure is to provide a glass comprising $SiO_2$, $Al_2O_3$, $P_2O_5$, and greater than about 1 mol % $K_2O$, wherein the glass has a coefficient of thermal expansion of at least about $90 \times 10^{-7}$ $°C.^{-1}$.

A second aspect of the disclosure is to provide an ion exchanged glass comprising $SiO_2$, $Al_2O_3$, $P_2O_5$, and greater than about 1 mol % $K_2O$. The ion exchanged glass has a coefficient of thermal expansion of at least about $90 \times 10^{-7}$ $°C.^{-1}$ and has a Vickers crack initiation threshold of at least about 15 kgf.

A third aspect of the disclosure is to provide a method of ion exchanging a glass. The method comprises: providing a glass comprising $SiO_2$, $Al_2O_3$, $P_2O_5$, and greater than about 1 mol % $K_2O$ and having a coefficient of thermal expansion of at least about $90 \times 10^{-7}$ $°C.^{-1}$; providing an ion exchange bath, wherein the ion exchange bath comprises $KNO_3$ and is at a temperature in a range from about 370° C. to 390° C.; and ion exchanging the glass in the ion exchange bath for a time period of up to about two hours. The ion exchanged glass has a layer under a compressive stress, the layer extending from a surface of the glass to a depth of layer of at least about 30 μm.

These and other aspects, advantages, and salient features of the present disclosure will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %). Coefficients of thermal expansion (CTE) are expressed in terms of $10^{-7}/°$ C. and represent a value measured over a temperature range from about 20° C. to about 300° C., unless otherwise specified.

As used herein, the term "liquidus temperature," or "$T^L$" refers to the temperature at which crystals first appear as a molten glass cools down from the melting temperature, or the temperature at which the very last crystals melt away as temperature is increased from room temperature. As used herein, the term "165 kP temperature" or "$T^{165\ kP}$" refers to the temperature at which the glass or glass melt has a viscosity of 160,000 Poise (P), or 160 kiloPoise (kP). As used herein, the term "35 kP temperature" or "$T^{35kP}$" refers to the temperature at which the glass or glass melt has a viscosity of 35,000 Poise (P), or 35 kiloPoise (kP).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO, for example," is one in which MgO is not actively added or batched into the glass, but may be present in very small amounts as a contaminant.

Vickers crack initiation thresholds described herein are determined by applying and then removing an indentation load to the glass surface at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

Figure 1:
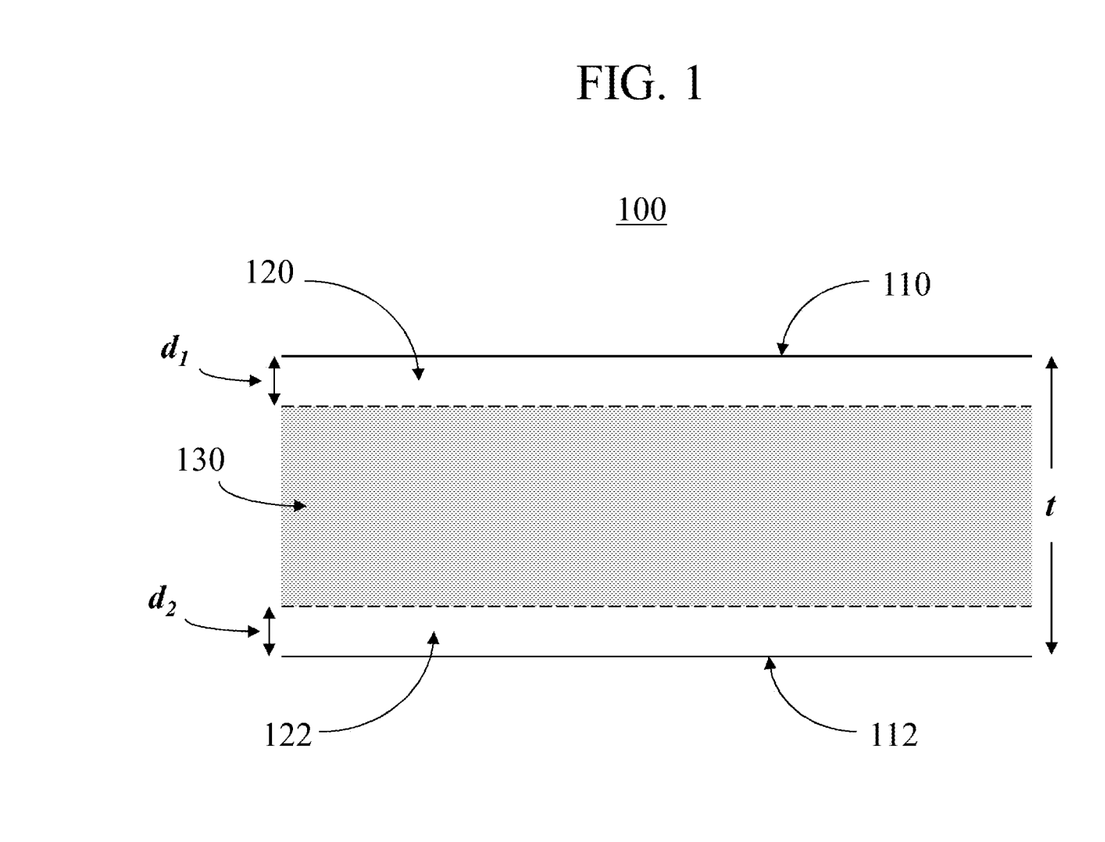
FIG. 1 is a schematic cross-sectional view of a glass sheet that has been ion exchanged.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein is an ion exchangeable glass having a high coefficient of thermal expansion (CTE) that may be used as a large format cover glass. The glass (also referred to herein as "high CTE glass") is also capable of undergoing ion exchange at a rate that is greater than that of similar glasses. Once ion exchanged, the glass exhibits high resistance to cracking, as measured by Vickers indentation.

The high CTE glasses described herein comprise $SiO_2$, $Al_2O_3$, $P_2O_5$, and $K_2O$. In some embodiments, the glass consists essentially of or comprises from about 57 mol % to about 75 mol % $SiO_2$ (i.e., 57 mol %≤$SiO_2$≤75 mol %); from about 6 mol % to about 17 mol % $Al_2O_3$ (i.e., 6 mol %≤$Al_2O_3$≤17 mol %); from about 2 mol % to about 7 mol % $P_2O_5$ (i.e., 2 mol %≤$P_2O_5$≤7 mol %); from about 14 mol % to about 17 mol % $Na_2O$ (i.e., 14 mol %≤$Na_2O$≤17 mol %); and greater than about 1 mol % to about 5 mol % $K_2O$ (i.e., 1 mol %<$K_2O$≤5 mol %). In some embodiments, the glass consists essentially of or comprises from about 57 mol % to about 59 mol % $SiO_2$ (i.e., 57 mol %≤$SiO_2$≤59 mol %); from about 14 mol % to about 17 mol % $Al_2O_3$ (i.e., 14 mol %≤$Al_2O_3$≤17 mol %); from about 6 mol % to about 7 mol % $P_2O_5$ (i.e., 6 mol %≤$P_2O_5$≤7 mol %); from about 16 mol % to about 17 mol % $Na_2O$ (i.e., 16 mol %≤$Na_2O$≤17 mol %); and greater than about 1 mol % to about 5 mol % $K_2O$ (i.e., 1 mol %<$K_2O$≤5 mol %). In certain embodiments, the glass further comprises up to about 2 mol % MgO (i.e., 0 mol %≤MgO≤2 mol %) and/or up to about 1 mol % CaO (i.e., 0 mol % CaO≤1 mol %). In some embodiments, the glass is substantially free of MgO. In some embodiments, the glass is substantially free of $B_2O_3$. Compositions, strain points, anneal points, and softening points of non-limiting examples of these glasses are listed in Table 1.

Silica ($SiO_2$) is the primary network former in the glasses described herein. In some embodiments, these glasses comprise from about 57 mol % to about 75 mol % $SiO_2$. Higher amounts (e.g., greater than about 60 mol %) of silica tend to lower the coefficient of thermal expansion. Accordingly, in some embodiments, the glasses comprise from about 57 mol % to about 59 mol % $SiO_2$.

Alumina ($Al_2O_3$) primarily facilitates ion exchange. In addition, $Al_2O_3$ suppresses phase separation. In some embodiments, the glasses described herein include from about 6 mol % to about 17 mol % $Al_2O_3$. In other embodiments, these glasses comprise greater than about 13 mol % $Al_2O_3$, and, in some embodiments, from about 14 mol % to about 17 mol % $Al_2O_3$.

The presence of alkali metal oxides $Na_2O$ and $K_2O$ increases the CTE of the glass. $K_2O$ plays a primary role in increasing CTE, followed by $Na_2O$. However, the presence of $K_2O$ tends to lower compressive stress when the glass is ion exchanged and lowers the temperature at which zircon breaks down ($T^{breakdown}$) in the presence of the glass melt. The glasses described herein, in some embodiments, comprise greater than about 1 mol % $K_2O$. In some embodiments, the glass comprises greater than about 1 mol % to about 5 mol % $K_2O$. The presence of $Na_2O$ in the glass enhances the ion exchangeability of the glass. In some embodiments, the glass comprises from about 14 mol % to about 17 mol % $Na_2O$ and, in other embodiments, from about 16 mol % to about 17 mol % $Na_2O$. The glass may, in some embodiments, further comprise other alkali metal oxides ($Li_2O$, $Rb_2O$, $Cs_2O$), but these oxides either inhibit ion exchange, result in lower surface compressive stress in the ion exchange glass, or are relatively expensive. In some embodiments, the glass comprise less than about 1.5 mol % $Li_2O$, and, in certain embodiments, is free or substantially free of $Li_2O$.

The alkaline earth oxide MgO promotes ion exchange of the glass and increases the surface compressive stress in the ion exchanged glass, but tends to reduce the coefficient of thermal expansion of the glass. In some embodiments, the glasses described herein comprise up to about 2 mol % MgO. In certain embodiments, the glass is free or substantially free of MgO. CaO tends to inhibit ion exchange and decreases the CTE of the glass. Accordingly, the glass may comprise up to about 1 mol % CaO.

In some embodiments, the total amount of alkali metal oxides ($R_2O$) and alkaline earth oxides (R'O) in these glasses is greater than about 18 mol % (i.e., $R_2O$+R'O>18 mol %).

The presence of $P_2O_5$ in the glass promotes ion exchange of the glass by increasing the diffusivity of certain cations such as, for example, $K^+$. in addition, $P_2O_5$ tends to increase the temperature at which zircon breaks down ($T^{breakdown}$) in the presence of the glass melt. In some embodiments, the glasses described herein comprise from about 2 mol % to about 7 mol % $P_2O_5$. In some embodiments, the glass comprises greater than about 5 mol % $P_2O_5$ to about 7 mol % $P_2O_5$; and, in certain embodiments, from about 6 mol % to about 7 mol % $P_2O_5$.

The glasses described herein have coefficients of thermal expansion (CTE) of at least about $90 \times 10^{-7}$ °C.$^{-1}$. In other embodiments, the CTE is at least about $95 \times 10^{-7}$ °C.$^{-1}$, and in still other embodiments, at least about $100 \times 10^{-7}$ °C. In certain embodiments, the CTE is in a range from about $90 \times 10^{-7}$ °C.$^{-1}$ up to about $100 \times 10^{-7}$ °C.$^{-1}$, and, in other embodiments, from about $90 \times 10^{-7}$ °C.$^{-1}$ up to about $110 \times 10^{-7}$ °C.$^{-}$. In other embodiments, the CTE is in a range from about $95 \times 10^{-7}$ °C.$^{-1}$ up to about $100 \times 10^{-7}$ °C.$^{-1}$ and, in some embodiments up to about $105 \times 10^{-7}$ °C. CTEs determined for the glasses listed in Table 1 are listed in Tables 1 and 2. Substituting K$_2$O for MgO in the glass tends to increase the CTE of the glass, as illustrated by example 6 in Tables 1 and 2. Examples 6, 7, and 8 in Tables 1 and 2 demonstrate the ability to "tune in" or "tailor" CTE by adjusting the amount of K$_2$O in the glass. Because it has the highest Al$_2$O$_3$ and lowest K$_2$O concentrations of these three glasses, example 6 will have the highest compressive stress when ion exchanged. Examples 9, 10, and 11 show the effect of substituting MgO for Al$_2$O$_3$ on CTE. Glasses in the series of examples 12-14 demonstrate the effect on CTE of the transition from a "base" glass composition that contains MgO and a lesser amount of K$_2$O (example 12) to a glass that contains K$_2$O and is substantially free of MgO (example 14). Glasses in the series 15 to 20 illustrate the effect on CTE of the transition from a base glass that contains K$_2$O and is substantially MgO-free (example 15) to a glass that contains MgO and a lesser amount of K$_2$O (example 20).

The glass glasses described herein are fusion formable; i.e., the glasses have liquidus temperatures $T^L$ that allow them to be formed by the fusion draw method or by other down-draw methods known in the art. In order to be fusion formable, the liquidus temperature of a glass should be less than the 160 kP temperature $T^{160\ kP}$ of the glass (i.e., $T^L < T^{160P}$).

The hardware used in the fusion draw process, such as the isopipe, is often made from zircon. If the temperature at which the zircon in the isopipe breaks down to form zirconia and silica (also referred to herein as the "breakdown temperature" or "$T^{breakdown}$") is less than any temperature seen on the isopipe, the zircon will break down to form silica and zirconia and, as a result, the glass formed by the fusion process will contain zirconia inclusions (also referred to as "fusion line zirconia"). It is therefore desirable to form the glass temperatures that are too low to decompose zircon and create zirconia, and thus prevent the formation of zirconia defects in the glass. Alternatively, the isopipe may be made of other refractory materials, such as alumina, thus eliminating the breakdown of zircon as a factor in the fusion draw process.

Because fusion is essentially an isoviscous process, the highest temperature seen by the glass corresponds to a particular viscosity of the glass. In those standard fusion-draw operations known in the art, this viscosity is about 35 kP, and the temperature at which this viscosity is attained is referred to as the 35 kP temperature, or $T^{35kP}$.

In some embodiments, the high CTE glasses described herein are compatible with zircon, and $T^{breakdown} > T^{35kP}$. For example, the composition of sample 6 (Table 1) meets the CTE requirements for these glasses, but is not zircon compatible, since the 35 kP temperature exceeds the zircon breakdown temperature, as shown in Table 2. In order to make the glass zircon compatible, the 6 composition may be modified to replace about 1 mol % of the Al$_2$O$_3$ with MgO as shown in the composition of sample 30. In order to make the glass zircon compatible, the composition of sample 6 has been modified to substitute about 1 mol % MgO for the Al$_2$O$_3$ present in the glass, as shown in the composition of sample 30 in Table 1. According to zircon breakdown models, the zircon breakdown temperature $T^{breakdown}$ will either be unchanged or slightly increase as a result of the substitution of MgO for Al$_2$O$_3$. As shown in Tables 1 and 2, this slight change in composition reduces the 35 kP temperature $T^{35kP}$ of the glass from 1244° C. to 1211° C. Assuming that the zircon breakdown temperature remains unchanged at 1215° C., this glass is considered to be zircon compatible. The substitution of MgO and Al$_2$O$_3$ does not substantially change the CTE or, when ion exchanged, the compressive stress (CS), depth of layer (DOL), and Knoop indentation threshold values of the glass. Glass sample 28, for example, is very close to the composition of sample 30, and thus demonstrates that values for CTE, CS, DOL, and indentation threshold (Tables 3a and 3b) of the glass are retained when MgO is substituted for Al$_2$O$_3$. Density, $T^L$, $T^{160P}$, $T^{35kP}$, and $T^{breakdown}$ for selected examples listed in Table 1 are listed in Table 2.

In some embodiments, the glasses described herein are ion exchanged using those means known in the art. In one non-limiting example, the glass is immersed in a molten salt bath containing an alkali metal cation such as, for example, K$^+$, which is larger than the Na$^+$ cation present in the glass. Means other than immersion in a molten salt bath may be used to ion exchange of the glass. Such means include, but are not limited to, the application of a paste or gel containing the cation to be introduced into the glass to at least one surface of the glass.

The ion exchanged glass has at least one surface layer that is under a compressive stress (CS), as schematically shown in FIG. 1. Glass 100 has a thickness t, first surface 110, and second surface 112. Glass 100, in some embodiments, has a thickness t of up to about 2 mm, in other embodiments, to about 1 mm, in other embodiments, up to 0.7 mm, in still other embodiments, up to about 0.5 mm. Glass 100 has a first layer 120 under a compressive stress ("compressive layer") extending from first surface 110 to a depth of layer d$_1$ into the bulk of the glass article 100. In the embodiment shown in FIG. 1, glass 100 also has a second compressive layer 122 under compressive stress extending from second surface 112 to a second depth of layer d$_2$. Glass 100 also has a central region 130 that extends from d$_1$ to d$_2$. Central region 130 is under a tensile stress or central tension, which balances or counteracts the compressive stresses of layers 120 and 122. The depths of layer d$_1$, d$_2$ of first and second compressive layers 120, 122 protect the glass 100 from the propagation of flaws introduced by sharp impact to first and second surfaces 110, 112 of glass 100, while the magnitude of the compressive stress in first and second compressive layers 120, 122 minimizes the likelihood of a flaw penetrating through the depth d$_1$, d$_2$ of first and second compressive layers 120, 122.

In some embodiments, the ion exchanged glass described herein has a compressive layer extending from a surface of the glass to a depth of layer of at least about 30 μm and, in certain embodiments, the depth of layer is in a range from about 30 μm up to about 50 μm. The compressive layer(s) of the glass, in some embodiments, are under a compressive stress of at least about 700 MPa, and, in other embodiments, at least about 800 MPa when ion exchanged to a depth of layer of at least about 30 μm. Tables 3a and 3b list compressive stress CS, depth of layer DOL, and Vickers crack indentation threshold after ion exchange in a molten KNO$_3$ salt bath at 390° C. and 370° C., respectively, for glass compositions listed in Table 1. Unless otherwise provided in Table 2, the stress optical coefficient (SOC) for the ion exchanged glasses listed in Tables 3a and 3b is 30.1.

The high CTE glasses described herein also undergo rapid ion exchange. The lower CS, higher rate of diffusivity, and higher indentation threshold suggest a more open network for these high CTE glasses. For example, the present glass may ion exchanged in an ion exchange bath comprising molten $KNO_3$ at a temperature in a range from about 370° C. to about 390° C. to a depth of layer of greater than 30 μm in less than two hours. In a particular example, sample 6 (Table 1) ion-exchanges to compressive stress of 820 MPa and 50 μm depth of layer when immersed in molten $KNO_3$ at 390° C. for 1 hour (Table 3a).

The ion exchanged glasses described herein have a Vickers crack initiation threshold of at least about 15 kilograms force (kgf); in other embodiments, at least 20 kgf; and, in still other embodiments, at least about 30 kgf. In some embodiments, the Vickers crack initiation threshold of the ion exchanged glass is at least 30 kgf, in other embodiments, at least 40 kgf, and, in still other embodiments, the Vickers crack initiation threshold is at least 50 kgf. In certain embodiments, the Vickers crack initiation threshold is in a range from about 30 kgf up to about 50 kgf. Vickers crack indentation data for glasses compositions in Table 1 are listed Table 3a and 3b.

Figure 2:
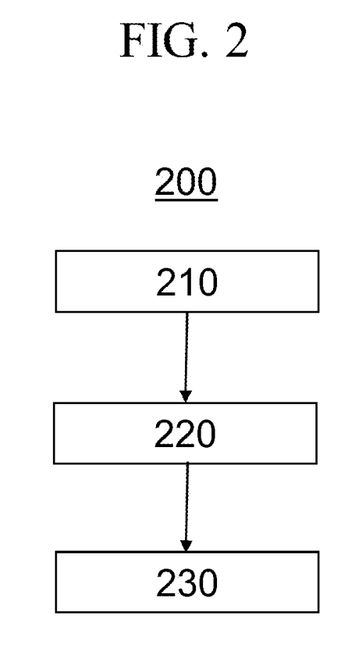
FIG. 2 a schematic representation of a method of ion exchanging a glass.

In another aspect, a method of ion exchanging a glass is also provided. The steps in the method are schematically represented in FIG. 2. Method 200 includes a first step 210 in which a glass comprising $SiO_2$, $Al_2O_3$, $P_2O_5$, and $K_2O$ and having a coefficient of thermal expansion of at least $95 \times 10^{-7}$ °C.$^{-1}$, as described hereinabove, is provided. In step 220, an ion exchange bath comprising or consisting essentially of $KNO_3$ is provided. The ion exchange bath may contain other salts such as, for example, $NaNO_3$, or may contain only or consist essentially of $KNO_3$. The ion exchange bathe is maintained at a temperature in a range from about 370° C. to 390° C. throughout the process. The glass is then ion exchanged in the ion exchange bath for a time period of up to about two hours (step 230), after which time the ion exchanged glass has a layer under a compressive stress, the layer extending from a surface of the glass to a depth of layer of at least about 30 μm and, in some embodiments, the depth of layer is in a range from about 30 μm up to about 50 μm. The layer(s) of the glass, in some embodiments, are under a compressive stress of at least about 700 MPa, and, in other embodiments, at least about 800 MPa.

In some embodiments, the ion exchanged glass has a Vickers crack initiation threshold of at least about 30 kgf and, in certain embodiments, the Vickers crack initiation threshold is in a range from about 30 kgf up to about 50 kgf.

TABLE 1

Compositions, strain points, anneal points, softening points, and coefficients of thermal expansion of glasses.

| Composition (mol %) | 1 | 2 | 3 | 4 | 5 | 6 |
|---|---|---|---|---|---|---|
| $SiO_2$ | 70.28 | 72.05 | 74.23 | 72.44 | 73.69 | 58.12 |
| $Al_2O_3$ | 10.49 | 8.75 | 6.50 | 8.99 | 6.95 | 16.38 |
| $P_2O_5$ | 2.55 | 2.61 | 2.31 | 2.01 | 2.08 | 6.55 |
| $Na_2O$ | 14.17 | 14.00 | 14.48 | 14.04 | 14.78 | 16.53 |
| $K_2O$ | 2.47 | 2.55 | 2.46 | 2.47 | 2.46 | 2.34 |
| MgO | 0.01 | 0.01 | 0.01 | 0.01 | 0.01 | 0.04 |
| CaO | 0.02 | 0.02 | 0.02 | 0.02 | 0.02 | 0.03 |
| $SnO_2$ | 0.00 | 0.01 | 0.01 | 0.01 | 0.00 | 0.00 |
| Strain Pt. (° C.) | 567 | 533 | 508 | 522 | 507 | 588 |
| Anneal Pt. (° C.) | 616 | 581 | 557 | 572 | 556 | 645 |
| Softening Pt. (° C.) | 888.5 | 875.5 | 839.8 | 848 | 825.4 | 919.4 |
| CTE ($1 \times 10^{-7}$/° C.) | 91.3 | 94.5 | 93.3 | 92.5 | 92.2 | 97.7 |

TABLE 1-continued

Compositions, strain points, anneal points, softening points, and coefficients of thermal expansion of glasses.

| Composition (mol %) | 7 | 8 | 9 | 10 | 11 | 12 |
|---|---|---|---|---|---|---|
| $SiO_2$ | 57.87 | 58.74 | 57.48 | 57.69 | 57.63 | 57.48 |
| $Al_2O_3$ | 15.80 | 14.35 | 16.61 | 15.96 | 15.50 | 16.68 |
| $P_2O_5$ | 6.79 | 6.06 | 6.75 | 6.49 | 6.72 | 6.59 |
| $Na_2O$ | 16.19 | 16.64 | 16.75 | 17.00 | 16.76 | 16.65 |
| $K_2O$ | 3.27 | 4.14 | 2.27 | 2.23 | 2.28 | 1.94 |
| MgO | 0.04 | 0.03 | 0.04 | 0.51 | 0.98 | 0.54 |
| CaO | 0.03 | 0.03 | 0.03 | 0.03 | 0.03 | 0.03 |
| $SnO_2$ | 0.01 | 0.01 | 0.09 | 0.10 | 0.10 | 0.10 |
| Strain Pt. (° C.) | 564 | 542 | 584 | 579 | 568 | 580.5 |
| Anneal Pt. (° C.) | 617 | 593 | 641 | 634 | 621 | 634.6 |
| Softening Pt. (° C.) | 887.2 | 851.4 | 913.6 | 904.1 | 889.8 | 916.6 |
| CTE ($1 \times 10^{-7}$/° C.) | 102.2 | 108.2 | 98.2 | 97.2 | 99.2 | 93.9 |

| Composition (mol %) | 13 | 14 | 15 | 16 | 17 | 18 |
|---|---|---|---|---|---|---|
| $SiO_2$ | 57.58 | 57.45 | 57.75 | 57.88 | 58.14 | 58.45 |
| $Al_2O_3$ | 16.66 | 16.63 | 16.58 | 16.58 | 15.84 | 15.57 |
| $P_2O_5$ | 6.61 | 6.62 | 6.55 | 6.54 | 6.53 | 6.51 |
| $Na_2O$ | 16.61 | 16.69 | 16.63 | 16.53 | 16.74 | 16.62 |
| $K_2O$ | 2.40 | 2.45 | 2.33 | 2.29 | 2.08 | 1.96 |
| MgO | 0.03 | 0.02 | 0.01 | 0.03 | 0.53 | 0.75 |
| CaO | 0.03 | 0.02 | 0.04 | 0.04 | 0.04 | 0.04 |
| $SnO_2$ | 0.10 | 0.11 | 0.10 | 0.10 | 0.09 | 0.10 |
| Strain Pt. (° C.) | 582 | 579.1 |  | 586 | 573 | 571 |
| Anneal Pt. (° C.) | 635.8 | 634.2 |  | 643 | 629 | 626 |
| Softening Pt. (° C.) | 910.2 | 914.6 |  | 927.6 | 911.6 | 905.3 |
| CTE ($1 \times 10^{-7}$/° C.) | 97.1 | 96.9 |  | 96 | 95.3 | 94.4 |

| Composition (mol %) | 19 | 20 | 21 | 22 | 23 | 24 |
|---|---|---|---|---|---|---|
| $SiO_2$ | 58.21 | 58.13 | 57.92 | 57.91 | 57.74 | 57.68 |
| $Al_2O_3$ | 15.98 | 16.05 | 16.38 | 16.35 | 16.33 | 16.29 |
| $P_2O_5$ | 6.50 | 6.47 | 6.51 | 6.53 | 6.56 | 6.57 |
| $Na_2O$ | 16.45 | 16.45 | 16.46 | 16.47 | 16.52 | 16.49 |
| $K_2O$ | 1.14 | 1.06 | 1.13 | 1.50 | 1.85 | 2.09 |
| MgO | 1.58 | 1.69 | 1.46 | 1.10 | 0.87 | 0.74 |
| CaO | 0.04 | 0.04 | 0.04 | 0.04 | 0.04 | 0.04 |
| $SnO_2$ | 0.10 | 0.10 | 0.10 | 0.10 | 0.10 | 0.10 |
| Strain Pt. (° C.) |  | 586 | 583 | 580 | 576 | 574 |
| Anneal Pt. (° C.) |  | 641 | 639 | 636 | 632 | 630 |
| Softening Pt. (° C.) |  | 923.3 | 917.9 | 915.1 | 910.8 | 904 |
| CTE ($1 \times 10^{-7}$/° C.) |  | 90.3 | 90.9 | 92.3 | 93.8 | 94.8 |

| Composition (mol %) | 25 | 26 | 27 | 28 | 29 | 30 |
|---|---|---|---|---|---|---|
| $SiO_2$ | 57.56 | 57.68 | 58.07 | 58.11 | 57.95 | 57.86 |
| $Al_2O_3$ | 16.21 | 16.31 | 15.89 | 15.57 | 16.33 | 15.34 |
| $P_2O_5$ | 6.56 | 6.55 | 6.57 | 6.55 | 6.58 | 6.60 |
| $Na_2O$ | 16.43 | 16.49 | 16.56 | 16.52 | 16.57 | 16.63 |
| $K_2O$ | 2.59 | 2.32 | 2.29 | 2.28 | 2.30 | 2.36 |
| MgO | 0.50 | 0.50 | 0.49 | 0.84 | 0.13 | 1.07 |
| CaO | 0.04 | 0.04 | 0.04 | 0.04 | 0.04 | 0.04 |
| $SnO_2$ | 0.11 | 0.10 | 0.10 | 0.10 | 0.10 | 0.10 |
| Strain Pt. (° C.) | 570 | 572 | 568 | 561 | 574 | 556 |

TABLE 1-continued

Compositions, strain points, anneal points, softening points, and coefficients of thermal expansion of glasses.

| | | | | | | |
|---|---|---|---|---|---|---|
| Anneal Pt. (° C.) | 625 | 629 | 622 | 616 | 629 | 609 |
| Softening Pt. (° C.) | 899.1 | 907.8 | 898.6 | 892 | 908.4 | 884 |

Compositions, strain points, anneal points, softening points, and coefficients of thermal expansion of glasses.

| | | | | | | |
|---|---|---|---|---|---|---|
| CTE Composition (mol %) $(1 \times 10^{-7}/° C.)$ | 97.4 25 | 95.6 26 | 95.8 27 | 96.5 28 | 96.1 29 | 97.3 30 |

TABLE 2

Coefficients of thermal expansion of glasses, 200 Poise temperatures T200, 35 kilopoise temperatures $T^{35kP}$, 160 kilopoise temperatures $T^{160kP}$, liquidus temperatures $T^L$, liquidus viscosities, zircon breakdown temperatures $T^{breakdown}$, zircon breakdown viscosities, and stress optical coefficients SOC for glasses listed in Table 1.

| | Sample | | | | | |
|---|---|---|---|---|---|---|
| | 1 | 2 | 3 | 4 | 5 | 6 |
| CTE $(1 \times 10^{-7}/° C.)$ | 91.3 | 94.5 | 93.3 | 92.5 | 92.2 | 97.7 |
| Density (g/cm³) | 2.4 | 2.393 | 2.386 | 2.401 | 2.389 | 2.42 |
| $T^{200P}$ (° C.) | 1701 | 1673 | 1634 | 1677 | 1628 | 1677 |
| $T^{35kP}$ (° C.) | 1181 | 1132 | 1107 | 1137 | 1095 | 1244 |
| $T^{160kP}$ (° C.) | 1081 | 1045 | 1024 | 1041 | 1006 | 1156 |
| $T^L$ (° C.) | | | | | | 780 |
| Liquidus Viscosity (P) | | | | | | 4.07 × 10⁹ |
| $T^{breakdown}$ (° C.) | | | | | | 1215 |
| Zircon Breakdown Viscosity (P) | | | | | | 56320.22 |
| SOC | 30.19 | 30.69 | 30.59 | | 29.77 | 30.07 |

| | Sample | | | | | |
|---|---|---|---|---|---|---|
| | 7 | 8 | 9 | 10 | 11 | 12 |
| CTE $(1 \times 10^{-7}/° C.)$ | 102.2 | 108.2 | 98.2 | 97.2 | 99.2 | 93.9 |
| Density (g/cm³) | 2.424 | 2.427 | 2.425 | 2.427 | 2.43 | 2.421 |
| $T^{200P}$ | 1660 | 1621 | 1676 | 1672 | 1648 | 1675 |
| $T^{35kP}$ (° C.) | 1208 | 1164 | 1227 | 1213 | 1205 | 1237 |
| $T^{160kP}$ (° C.) | 1117 | 1074 | 1137 | 1124 | 1116 | 1150 |
| $T^L$ (° C.) | | | | | 815 | |
| Liquidus Viscosity (P) | | | | | 3.19 × 10⁸ | |
| $T^{breakdown}$ (° C.) | | | | | | |
| Zircon Breakdown Viscosity (P) | | | | | | |
| SOC | | | | | | 30.16 |

| | Sample | | | | | |
|---|---|---|---|---|---|---|
| | 13 | 14 | 15 | 16 | 17 | 18 |
| CTE $(1 \times 10^{-7}/° C)$ | 97.1 | 96.9 | | 96 | 95.3 | 94.4 |
| Density (g/cm³) | 2.419 | 2.42 | | 2.418 | 2.419 | 2.418 |
| $T^{200P}$ (° C.) | 1680 | 1684 | | 1691 | 1686 | 1686 |
| $T^{35kP}$ (° C.) | 1237 | 1236 | | 1245 | 1226 | 1225 |
| $T^{160kP}$ (° C.) | 1149 | 1148 | | 1158 | 1139 | 1137 |
| $T^L$ (° C.) | | | | | | |
| Liquidus Viscosity (P) | | | | | | |
| $T^{breakdown}$ (° C.) | | | | | | |
| Zircon Breakdown Viscosity (P) | | | | | | |
| SOC | 30.19 | 30.69 | 30.59 | | 29.77 | 30.07 |

TABLE 2-continued

Coefficients of thermal expansion of glasses, 200 Poise temperatures T200, 35 kilopoise temperatures $T^{35kP}$, 160 kilopoise temperatures $T^{160kP}$, liquidus temperatures $T^L$, liquidus viscosities, zircon breakdown temperatures $T^{breakdown}$, zircon breakdown viscosities, and stress optical coefficients SOC for glasses listed in Table 1.

| | Sample | | | | | |
|---|---|---|---|---|---|---|
| | 19 | 20 | 21 | 22 | 23 | 24 |
| CTE ($1 \times 10^{-7}/°$ C.) | | 90.3 | 90.9 | 92.3 | 93.8 | 94.8 |
| Density (g/cm³) | | 2.417 | 2.418 | 2.417 | 2.419 | 2.42 |
| $T^{200P}$(° C.) | | 1672 | 1664 | 1669 | 1671 | 1671 |
| $T^{35kP}$(° C.) | | 1233 | 1238 | 1242 | 1236 | 1236 |
| $T^{160kP}$(° C.) | | 1149 | 1152 | 1154 | 1148 | 1147 |
| $T^L$(° C.) | | | 920 | 870 | 820 | 860 |
| Liquidus Viscosity (P) | | | 37300854 | $1.6 \times 10^8$ | $8.63 \times 10^8$ | $1.7 \times 10^8$ |
| $T^{breakdown}$(° C.) | | | 1225 | 1215 | 1215 | 1200 |
| Zircon Breakdown Viscosity (P) | | | 43670.86 | 54671.7 | 54671.7 | 63334.06 |
| SOC | | | | | | |

| | Sample | | | | | |
|---|---|---|---|---|---|---|
| | 25 | 26 | 27 | 28 | 29 | 30 |
| CTE ($1 \times 10^{-7}/°$ C.) | 97.4 | 95.6 | 95.8 | 96.5 | 96.1 | 97.3 |
| Density (g/cm³) | 2.422 | 2.42 | 2.419 | 2.421 | 2.418 | 2.422 |
| $T^{200P}$(° C.) | 1668 | 1670 | 1666 | 1670 | 1677 | 1656 |
| $T^{35kP}$(° C.) | 1230 | 1236 | 1228 | 1222 | 1239 | 1211 |
| $T^{160kP}$(° C.) | 1142 | 1146 | 1137 | 1133 | 1150 | 1122 |
| $T^L$(° C.) | 840 | 840 | 790 | 780 | 795 | 780 |
| Liquidus Viscosity (P) | $3.03 \times 10^8$ | $2.79 \times 10^8$ | $9.32 \times 10^8$ | $1.99 \times 10^9$ | $1.45 \times 10^9$ | $1.27 \times 10^9$ |
| $T^{breakdown}$(° C.) | 1200 | 1210 | 1210 | 1215 | 1200 | 1225 |
| Zircon Breakdown Viscosity (P) | 57327.35 | 52857.13 | 46543.02 | 39171.32 | 66317.41 | 28069 |
| SOC | | | | | | 29.4 |

TABLE 3a

Compressive stresses CS, depths of layer DOL, and Vickers crack indentation thresholds for glasses listed in Table 1 that were ion exchanged in a molten KNO₃ bath at 390° C. Unless provided in Table 2, the stress optical coefficient (SOC) for the ion exchanged glasses is 30.1.

| | Sample | | | | | |
|---|---|---|---|---|---|---|
| | 1 | 2 | 3 | 5 | 6 | 7 |
| | 1 hour | | | | | |
| CS (MPa) | 622 | 453 | 425 | 482 | 820 | 684 |
| DOL(μm) | 33 | 26 | 22 | 24 | 50 | 59 |
| indentation threshold (kgf) | <10 | 10-20 | <10 | <10 | 40-50 | 40-50 |
| | 1.5 hours | | | | | |
| CS (MPa) | 664 | 557 | 420 | 442 | | 811 |
| DOL(μm) | 35 | 29 | 30 | 25 | | 49 |
| indentation threshold (kgf) | | | | | | |
| | 2 hours | | | | | |
| CS (MPa) | 634 | 458 | | | | 818 |
| DOL(μm) | 42 | 42 | | | | 54 |
| indentation threshold (kgf) | | | | | | |
| | 3 hours | | | | | |
| CS (MPa) | 898 | 857 | | | | 799 |
| DOL(μm) | 48.3 | 54.2 | | | | 64.7 |
| indentation threshold (kgf) | | | | | | 20-25 |

TABLE 3a-continued

Compressive stresses CS, depths of layer DOL, and Vickers crack indentation thresholds for glasses listed in Table 1 that were ion exchanged in a molten $KNO_3$ bath at 390° C. Unless provided in Table 2, the stress optical coefficient (SOC) for the ion exchanged glasses is 30.1.

| | Sample | | | | | |
|---|---|---|---|---|---|---|
| | 8 | 9 | 10 | 11 | 12 | 13 |
| 1 hour | | | | | | |
| CS (MPa) | 588 | 737 | 748 | 786 | 904 | 839 |
| DOL (μm) | 61 | 45 | 48 | 45 | 35 | 43 |
| indentation threshold (kgf) | 20-30 | 30-40 | 40-50 | | 40-50 | 40-50 |
| 1.5 hours | | | | | | |
| CS (MPa) | 653 | 816 | 818 | 784 | 904 | 844 |
| DOL (μm) | 68 | 55 | 50 | 50 | 39 | 48 |
| indentation threshold (kgf) | | | | | | |
| 2 hours | | | | | | |
| CS (MPa) | 669 | 815 | 787 | 779 | 876 | 830 |
| DOL (μm) | 74 | 62 | 60 | 58 | 48 | 60 |
| indentation threshold (kgf) | | | | | | |
| 3 hours | | | | | | |
| CS (MPa) | | | | | | |
| DOL (μm) | | | | | | |
| indentation threshold (kgf) | | | | | | |

| | Sample | | | | | |
|---|---|---|---|---|---|---|
| | 14 | 16 | 17 | 18 | 20 | 21 |
| 1 hour | | | | | | |
| CS (MPa) | 837 | 849 | 848 | 859 | 906 | |
| DOL (μm) | 49 | 44 | 41 | 39 | 32 | |
| indentation threshold (kgf) | 40-50 | 40-50 | | | 30-40 | |
| 1.5 hours | | | | | | |
| CS (MPa) | 831 | 848 | 844 | 855 | 910 | 909 |
| DOL (μm) | 49 | 49 | 47 | 46 | 36 | 35 |
| indentation threshold (kgf) | | | | | | 40-45 |
| 2 hours | | | | | | |
| CS (MPa) | 822 | 844 | 832 | 842 | 895 | 903 |
| DOL (μm) | 63 | 59 | 55 | 53 | 43 | 38.8 |
| indentation threshold (kgf) | | | | | | |
| 3 hours | | | | | | |
| CS (MPa) | | | | | | |
| DOL (μm) | | | | | | 898 |
| indentation threshold (kgf) | | | | | | 48.3 |

| | Sample | | | | | | |
|---|---|---|---|---|---|---|---|
| | 22 | 23 | 24 | 25 | 26 | 27 | 28 |
| 1 hour | | | | | | | |
| CS (MPa) | | | | | 835 | | |
| DOL (μm) | | | | | 40 | | |
| indentation threshold (kgf) | | | | | >50 | | |
| 1.5 hours | | | | | | | |
| CS (MPa) | 909 | 877 | 854 | 839 | 827 | 815 | 817 |
| DOL (μm) | 35 | 41 | 43 | 45 | 48 | 40 | 39 |
| indentation threshold (kgf) | 40-45 | | | | 40-50 | >50 | 40-50 |
| 2 hours | | | | | | | |
| CS (MPa) | 873 | 857 | 831 | 818 | | | |
| DOL (μm) | 43.2 | 46.7 | 50.9 | 54 | | | |
| indentation threshold (kgf) | 25-30 | 45-50 | | | | | |
| 3 hours | | | | | | | |
| CS (MPa) | 857 | 839 | 822 | 799 | | | |
| DOL (μm) | 54.2 | 58.3 | 59.9 | 64.7 | | | |
| indentation threshold (kgf) | | | 40-45 | 20-25 | | | |

TABLE 3b

Compressive stresses CS, depths of layer DOL, and Vickers crack indentation thresholds for glasses listed in Table 1 that were ion exchanged in a molten $KNO_3$ bath at 370° C. Unless provided in Table 2, the stress optical coefficient (SOC) for the ion exchanged glasses is 30.1.

| | Sample | |
|---|---|---|
| | 29 | 30 |
| 1 hour | | |
| CS (MPa) | 818 | 823 |
| DOL (μm) | 34 | 31 |
| indentation threshold (kgf) | 20-30 | 30-40 |
| 2 hours, 10 minutes | | |
| CS (MPa) | 819 | 809 |
| DOL (μm) | 48 | 43 |
| indentation threshold (kgf) | 30-40 | 30-40 |
| 3 hours | | |
| CS (MPa) | 816 | 802 |
| DOL (μm) | 55 | 49 |
| indentation threshold (kgf) | 40-50 | 30-40 |

TABLE 3b-continued

Compressive stresses CS, depths of layer DOL, and Vickers crack indentation thresholds for glasses listed in Table 1 that were ion exchanged in a molten KNO₃ bath at 370° C. Unless provided in Table 2, the stress optical coefficient (SOC) for the ion exchanged glasses is 30.1.

| | Sample | |
|---|---|---|
| | 29 | 30 |
| | 4 hours | |
| CS (MPa) | 811 | 797 |
| DOL (μm) | 62 | 58 |
| indentation threshold (kgf) | | |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure and appended claims.

The invention claimed is:

1. A glass, the glass comprising SiO$_2$, from 6 mol % to 17 mol % Al$_2$O$_3$, greater than 5 mol % P$_2$O$_5$, and greater than 1 mol % K$_2$O, wherein
R$_2$O+R'O is greater than 18 mol %, where R is at least one alkali metal and R' is at least one alkaline earth oxide,
the glass is substantially free of B$_2$O$_3$, and
the glass has a coefficient of thermal expansion of greater than 95×10$^{-7}$° C.$^{-1}$.

2. The glass of claim 1, wherein the glass is ion exchanged and has a Vickers crack initiation threshold in a range from greater than 20 kgf to 50 kgf.

3. The glass of claim 2, wherein the Vickers crack initiation threshold is in a range from 30 kgf up to 50 kgf.

4. The glass of claim 2, wherein the glass has a compressive layer extending from a surface of the glass to a depth of layer of at least 30 μm.

5. The glass of claim 4, wherein the depth of layer is in a range from 30 μm up to 50 μm.

6. The glass of claim 4, wherein the compressive layer has a compressive stress of at least 800 MPa.

7. The glass of claim 4, wherein the glass has been ion exchanged in an ion exchange bath comprising KNO$_3$ at a temperature in a range from 370° C. to 390° C. for up to two hours.

8. The glass of claim 1, wherein the glass has a liquidus temperature T$^L$, a 160 kP temperature T$^{160kP}$, a 35 kP temperature T$^{35kP}$, and a zircon breakdown temperature T$^{breakdown}$, wherein T$^L$<T$^{160kP}$ and T$^{breakdown}$>T$^{35kP}$.

9. The glass of claim 1, wherein the glass comprises from 57 mol % to 75 mol % SiO$_2$; from 6 mol % to 17 mol % Al$_2$O$_3$; from greater than 5 mol % to 7 mol % P$_2$O$_5$; from 14 mol % to 17 mol % Na$_2$O; and from greater than 1 mol % to 5 mol % K$_2$O.

10. The glass of claim 9, comprising from 0 mol % to 2 mol % MgO.

11. The glass of claim 9, wherein the glass comprises from 57 mol % to 59 mol % SiO$_2$; from greater than 13 mol % to 17 mol % Al$_2$O$_3$; from greater than 5 mol % to 7 mol % P$_2$O$_5$; from 16 mol % to 17 mol % Na$_2$O; and from 1 mol % to 5 mol % K$_2$O.

12. The glass of claim 1, wherein the glass comprises at least 13 mol % Al$_2$O$_3$.

13. The glass of claim 1, wherein the glass is substantially free of MgO.

14. The glass of claim 1, wherein the glass, when ion exchanged for one hour at 390° C. in a KNO$_3$ bath, has a Vickers crack initiation threshold of greater than 20 kgf.

15. An appliance, comprising the glass of claim 1.

16. The appliance of claim 15, further comprising a display.

17. An ion exchanged glass, the ion exchanged glass comprising SiO$_2$, from 6 mol % to 17 mol % Al$_2$O$_3$, greater than 5 mol % P$_2$O$_5$, greater than 1 mol % K$_2$O, wherein R$_2$O+R'O is greater than 18 mol %, where R is at least one alkali metal and R' is at least one alkaline earth oxide, and the glass is substantially free of B$_2$O$_3$, and wherein the glass has a coefficient of thermal expansion of greater than 95×10$^{-7}$° C.$^{-1}$ and has a Vickers crack initiation threshold in a range from greater than 20 kgf to 50 kgf.

18. The ion exchanged glass of claim 17, wherein the Vickers crack initiation threshold is in a range from 30 kgf up to 50 kgf.

19. The ion exchanged glass of claim 17, wherein the glass has a compressive layer extending from a surface of the glass to a depth of layer of at least 30 μm.

20. The ion exchanged glass of claim 19, wherein the depth of layer is in a range from 30 μm up to 50 μm.

21. The ion exchanged glass of claim 19, wherein the compressive layer has a compressive stress of at least 800 MPa.

22. The ion exchanged glass of claim 19, wherein the ion exchanged glass has been ion exchanged in an ion exchange bath comprising KNO$_3$ at a temperature in a range from 370° C. to 390° C. for up to two hours.

23. The ion exchanged glass of claim 17, wherein the ion exchanged glass has a liquidus temperature T$^L$, a 160 kP temperature T$^{160kP}$, a 35 kP temperature T$^{35kP}$, and a zircon breakdown temperature T$^{breakdown}$, wherein T$^L$<T$^{160P}$ and T$^{breakdown}$>T$^{35kP}$.

24. The ion exchanged glass of claim 17, wherein the ion exchanged glass comprises from 57 mol % to 59 mol % SiO$_2$; from greater than 13 mol % to 17 mol % Al$_2$O$_3$; from greater than 5 mol % to 7 mol % P$_2$O$_5$; from 16 mol % to 17 mol % Na$_2$O; and from greater than 1 mol % to 5 mol % K$_2$O.

25. The ion exchanged glass of claim 24, further comprising up to 2 mol % MgO.

26. The ion exchanged glass of claim 17, wherein the ion exchanged glass comprises at least 13 mol % Al$_2$O$_3$.

27. The ion exchanged glass of claim 17, wherein the ion exchanged glass is substantially free of MgO.

28. An appliance, comprising the ion exchanged glass of claim 17.

29. The appliance of claim 28, further comprising a display.

30. A method of ion exchanging a glass, the method comprising:
 a. providing a glass, the glass comprising SiO$_2$, from 6 mol % to 17 mol % Al$_2$O$_3$, greater than 5 mol % P$_2$O$_5$, and greater than 1% K$_2$O, wherein R$_2$O+R'O is greater than 18 mol %, where R is at least one alkali metal and R' is at least one alkaline earth oxide, the glass being substantially free of B$_2$O$_3$ and having a coefficient of thermal expansion of greater than 95×10$^{-7}$° C.$^{-1}$;
 b. providing an ion exchange bath, wherein the ion exchange bath comprises KNO$_3$ and is at a temperature in a range from 370° C. to 390° C.; and
 c. ion exchanging the glass in the ion exchange bath for a time period of up to two hours, wherein the ion exchanged glass has a layer under a compressive stress, the layer extending from a surface of the glass to a depth of layer of at least 30 μm.

31. The method of claim 30, wherein the ion exchanged glass has a Vickers crack initiation threshold of at least 4-5 in a range from 20 kgf to 50 kgf.

32. The method of claim 31, wherein the Vickers crack initiation threshold is in a range from 30 kgf up to 50 kgf.

33. The method of claim 30, wherein the depth of layer is in a range from 30 μm up to 50 μm.

34. The method of claim 30, wherein the compressive stress is at least 800 MPa.

35. The method of claim 30, wherein the ion exchanged glass comprises from 57 mol % to 59 mol % $SiO_2$; from greater than 13 mol % to 17 mol % $Al_2O_3$; greater than 5 mol % to 7 mol % $P_2O_5$; from 16 mol % to 17 mol % $Na_2O$; and greater than 1 mol % to 5 mol % $K_2O$.

36. The method of claim 35, further comprising up to 2 mol % MgO.

37. The method of claim 30, wherein the ion exchanged glass comprises at least 13 mol % $Al_2O_3$.

\* \* \* \* \*

UNITED STATES PATENT AND TRADEMARK OFFICE
CERTIFICATE OF CORRECTION

PATENT NO. : 9,969,644 B2  
APPLICATION NO. : 14/465888  
DATED : May 15, 2018  
INVENTOR(S) : Timothy Michael Gross et al.

Page 1 of 1

It is certified that error appears in the above-identified patent and that said Letters Patent is hereby corrected as shown below:

In the Claims

In Column 17, Line 5, Claim 31, after "threshold of" delete "at least 4-5".

Signed and Sealed this  
Twenty-sixth Day of May, 2020

Andrei Iancu  
*Director of the United States Patent and Trademark Office*